United States Patent
Salanitro et al.

(10) Patent No.: US 6,503,395 B1
(45) Date of Patent: Jan. 7, 2003

(54) SITU METHOD AND APPARATUS FOR BIODEGRADATION OF ALKYL ETHERS AND TERTIARY BUTYL ALCOHOL

(75) Inventors: Joseph Patrick Salanitro, Houston, TX (US); Paul Carr Johnson, Fountain Hills, AZ (US); Stephen Merle Stearns, Modesto, CA (US); Paul Michael Maner, Houston, TX (US); James Henry Miller, Katy, TX (US); Gerard Eugene Spinnler, Houston, TX (US)

(73) Assignee: Shell Oil Company, Houston, TX (US)

( * ) Notice: Subject to any disclaimer, the term of this patent is extended or adjusted under 35 U.S.C. 154(b) by 0 days.

(21) Appl. No.: 09/549,981

(22) Filed: Apr. 14, 2000

Related U.S. Application Data

(60) Provisional application No. 60/129,328, filed on Apr. 14, 1999.

(51) Int. Cl.[7] .................................................. C02F 3/00
(52) U.S. Cl. ...................... 210/610; 210/614; 210/620; 210/747; 210/908; 435/262.5; 405/128.45
(58) Field of Search ................................ 210/610, 614, 210/620, 747, 908; 435/262, 262.5; 405/128, 45, 128.7, 129.2

(56) References Cited

U.S. PATENT DOCUMENTS

| | | | | |
|---|---|---|---|---|
| 3,846,290 A | * | 11/1974 | Raymond ................... 210/610 |
| 4,593,760 A | * | 6/1986 | Visser et al. ................. 166/267 |
| 4,660,639 A | * | 4/1987 | Visser et al. ................. 166/267 |
| 5,006,250 A | * | 4/1991 | Roberts et al. ............. 210/747 |
| 5,120,160 A | | 6/1992 | Schwengel ................... 405/128 |
| 5,221,159 A | | 6/1993 | Billings et al. |
| 5,277,518 A | | 1/1994 | Billings et al. |
| 5,302,286 A | * | 4/1994 | Semprini et al. ........... 210/747 |
| 5,445,474 A | | 8/1995 | Lundegard et al. |
| 5,750,364 A | * | 5/1998 | Salanitro .................. 435/262.5 |
| 5,803,664 A | * | 9/1998 | Kawabata et al. .......... 210/747 |
| 5,811,016 A | * | 9/1998 | Salanitro .................... 210/610 |
| 5,874,001 A | | 2/1999 | Carter ........................ 210/610 |
| 5,902,734 A | * | 5/1999 | Salanitro .................. 435/262.5 |
| 6,224,770 B1 | * | 5/2001 | Savage et al. .............. 210/610 |
| 6,238,906 B1 | * | 5/2001 | Salanitro .................... 210/620 |
| 6,245,235 B1 | * | 6/2001 | Perriello ..................... 210/620 |

OTHER PUBLICATIONS

Search reach dated Jul. 24, 2000.

* cited by examiner

Primary Examiner—Christopher Upton
(74) Attorney, Agent, or Firm—Y. Grace Tsang

(57) ABSTRACT

A method and apparatus for the in situ purification of aquifers contaminated with ethers and/or alcohols using a bacterial culture, a method of delivering the culture to the subsurface, and an oxygen delivery system.

13 Claims, 9 Drawing Sheets

SITU METHOD AND APPARATUS FOR BIODEGRADATION OF ALKYL ETHERS AND TERTIARY BUTYL ALCOHOL

This Application claims the benefit of U.S. Provisional Application Serial No. 60/29328, filed Apr. 14, 1999, the entire disclosure of which is incorporated by reference.

FIELD OF THE INVENTION

This invention relates to the in situ purification of aquifers contaminated with oxygenate chemicals such as alkyl ethers and tertiary butyl alcohol. This invention further relates to a method and apparatus that cause the alkyl ethers and tertiary butyl alcohol to be biodegraded in Situ to carbon dioxide and water. In particular, the invention relates to the use of a bacterial culture, a method of delivery and/or bacterial stimulation in the subsurface, and an oxygen delivery system for the remediation of aquifers contaminated with methyl-t-butyl ether (MTBE).

BACKGROUND OF THE INVENTION

The 1990 Clean Air Act Amendments mandated that gasoline suppliers reformulate their gasoline blends to be cleaner burning, and to have less impact to the atmosphere. In response to this mandate, gasoline suppliers began to blend their fuels with oxygenate chemicals, such as alkyl ethers. In particular, methyl-tert-butyl ether (hereinafter "MTBE"), was used quite extensively, and often comprised up to 10 to 15% by volume of unleaded gasoline.

Now, having used oxygenated fuels for several years, it has become clear that these cleaner-burning fuels pose great threats to groundwater resources. In particular, many oxygenate chemicals are very soluble in water and are slow to degrade in the environment; hence they tend to accumulate in water resources once released to the environment. For example, MTBE has been detected in groundwater with high frequency in many states and there are well-documented cases of impacts to municipal water supply wells. In some cases these impacts result from accidental gasoline spills; in other cases they are attributed to the re-deposition of chemicals emitted to the atmosphere from partially combusted automobile exhaust.

It is also now known that when oxygenate chemicals including alkyl ethers, such as MTBE and tertiary butyl alcohol (hereinafter "TBA"), are found in the subsurface, then they are resistant to biodegradation under natural conditions. This is the main reason for their persistence and accumulation in soil and groundwater.

With the increase in our knowledge of the behavior of these chemicals, and the increase in documented impacts, regulatory agencies are now vigorously enforcing cleanup standards for MTBE and TBA in groundwater. As a result, practitioners are searching for technologies that can clean-up soil and aquifers contaminated with MTBE and TBA.

Shallow contaminated soil can be treated by excavating the contaminated soil and then treating it above-ground. However, in most cases, it is preferable to treat contaminated soils in situ so as to minimize disturbance of the site and prevent further release of the contaminants to the atmosphere. Along these lines, the invention described by Visser et al. (U.S. Pat. Nos. 4,593,760 and 4,660,639) has been used at some MTBE-impacted sites with success. Visser's process relates to the extraction of soil gas vapors from the subsurface. However, this process is limited in applicability to permeable soils located above the water table, and is limited to volatile alkyl ethers. Furthermore, by itself, it is a non-destructive process that must be coupled with above-ground treatment (such as thermal oxidation) if the alkyl ethers or TBA are to be destroyed.

While there is little performance data available, it is thought by practitioners that contaminated groundwater might be remediated by application of either pump-and-treat technology or in situ air sparging technology. In the former, contaminated groundwater is withdrawn by pumping from groundwater wells and is purified above-ground. Following purification, the groundwater is reinjected to the aquifer or discharged above-ground. A groundwater pump-and-treat system is viewed as both ineffective and expensive because it is maintenance-intensive, operations often are on the scale of decades, and it merely transfers contamination from the aqueous phase to the atmosphere, to a solid medium for later disposal, or to a surface treatment facility. In situ air sparging technology is described by Billings et al. (U.S. Pat. No. 5,221,159). In that invention, air is injected in situ into the contaminated groundwater with the hope that groundwater contaminants will be volatilized or that the addition of oxygen will help the aerobic biodegradation of readily biodegradable contaminants. With respect to application to oxygenate chemicals such as alkylethers and TBA, indigenous organisms capable of biodegrading these chemicals are not always present; if they are present, it is usually at such low numbers that the in situ air sparging process can practically only cause the volatilization of the alkylethers and TBA. Thus, application of this process would only cause the transfer of alkylethers and TBA from the groundwater to soil gas and the atmosphere. In some cases the vapors are collected and treated above-ground, but again, above-ground treatment of vapors is typically very expensive and problematic.

U.S. Pat. No. 5,874,001, issued Feb. 23, 1999, proposes a method for removing contaminants from ground water or soil by injecting oxygen gas into ground water.

To date, there is no in situ treatment process known to the practice that result in a satisfactory in situ destruction of the alkyethers and TBA. There is need, therefore, for a practicable in situ technology that results in the satisfactory destruction of the target alkyl ether(s) in situ, and that does not require the withdrawal and above-ground treatment and discharge of fluids.

U.S. Pat. Nos. 5,750,364 and 5,811,010, assigned to Shell Oil Company, relate to a bacterial culture that aerobically degrades alkylethers and TBA to non-toxic carbon dioxide and water. However, in-situ remediation of sub-surface chemical contaminants by delivering contaminant-degrading bacteria to the sub-surface (this overall process will hereinafter be referred to as "bio-augmentation") has not historically been embraced by the practice. This is mainly because most soils and aquifers already have sufficient numbers of microorganisms capable of causing substantial biodegradation of readily biodegradable compounds, and therefore addition of other organisms is not warranted. It is also accepted that delivering and maintaining non-indigenous microorganism cultures in the subsurface is a very difficult task.

Now, with the need to treat aquifers and soils contaminated with more recalcitrant chemicals, there is a need for a bio-augmentation process which can successfully deliver and maintain non-indigenous microorganism cultures in the subsurface. More specifically, there is a need for an effective bio-augmentation process for remediating oxygenate chemicals such as alkyl ethers, particularly MTBE, and TBA contamination in soils and groundwater.

SUMMARY OF THE INVENTION

This invention relates to a method and apparatus for the in situ bioremediation of aquifers contaminated with chemical contaminant(s) by injecting into the aquifers a microbial culture that degrades the contaminants(s). This invention further relates to a method and apparatus for the in situ bioremediation of aquifers contaminated with oxygenate chemicals such as alkyl ethers, such as MTBE, and/or t-butyl alcohol (TBA) by injecting into the aquifers a microbial culture that degrades MTBE and/or t-butyl alcohol. In particular, the invention uses (a) a bacterial culture capable of aerobically degrading the target chemicals, (b) a method for delivering the mixed culture to the subsurface with sufficient degrading activity, and (c) an oxygen delivery system injecting, by means of a network of at least two conduits which extend below the treatment zone, an oxygen-containing gas at a pressure of at least 5 psig (pounds per square inch gauge) above the hydrostatic pressure at each point of delivery, by pulsed injection, at a frequency in the range of from about once per week to about 10 times per day optimized so as to maximize aerobic biodegradation while maintaining less than 50%, preferably less than 10% volatilization of contaminants.

To reach the optimal delivery of the oxygen-containing gas, the injection frequency and volume at each injection point are adjusted to have the relationship according to the following equation:

$$e^{[(-V \times F \times N \times H)/(W \times B \times Q)]} > 0.50 \text{ (preferably} > 0.80, \text{ more preferably} > 0.90, \text{ still more preferably} > 0.93)$$

Wherein:
- e=natural exponential
- V=volume of gas injected at each injection point (ft3)
- F=frequency of injections (number of injections per day)
- N=number of gas injection points
- W=width of treatment zone perpendicular to groundwater flow path (ft)
- B=vertical thickness of treatment zone (ft)
- Q=specific discharge of groundwater to treatment zone (ft/day)
- H=Henry's Constant for contaminant of interest ((mg/L-water)/(mg/L-air))

BRIEF DSCRIPTION OF THE DRAWINGS

DETAILED DESCRIPTION OF THE INVENTION

The present invention provides a process for the in-situ remediation of sub-surface chemical contaminants by delivering a bacterial culture capable of degrading the contaminants at a sub-surface contaminated site. This process successfully delivers and maintains microorganism cultures in subsurface utilizing a network/galleries of culture and/or oxygen-containing stream delivery apparatus.

The present invention also provides a process for remediating in-situ oxygenate chemicals including alkyl ethers and alkyl alcohols, particularly branched alkyl ethers/alcohol's, more particularly tertiary alkyl ethers/alcohols, still more particularly MTBE and TBA contamination in soils and groundwater by delivering to the aquifers and/or soils a bacterial culture capable of degrading such oxygenate chemicals, particularly branched alkyl ethers/alcohols such as MTBE and/or TBA, preferably to carbon dioxide and water, more preferably to carbon dioxide and water within 70 hours. The bacterial culture can be, but not limited to, an indigenous culture, collected and optionally enriched and/or grown to a larger quantity, from the contaminated site. Non-limiting and illustrative examples of the oxygenates include diethyl ether (DEE), dimethyl ether (DME), methyl ethyl ether (MEE), methyl n-propyl ether (MPE), ethyl n-propyl ether, methyl isopropyl ether, ethyl isopropyl ether, di-t-butyl ether, di-isopropyl ether (DIPE), di-isobutyl ether, isopropyl isobutyl ether, ethyl t-butyl ether (ETBE), t-amyl ethyl ether, t-amyl propyl ether, t-amyl isobutyl ether or methyl-t-amyl ether. As one aspect of the present invention, the bacterial culture delivered is a non-indigenous culture.

Figure 1:
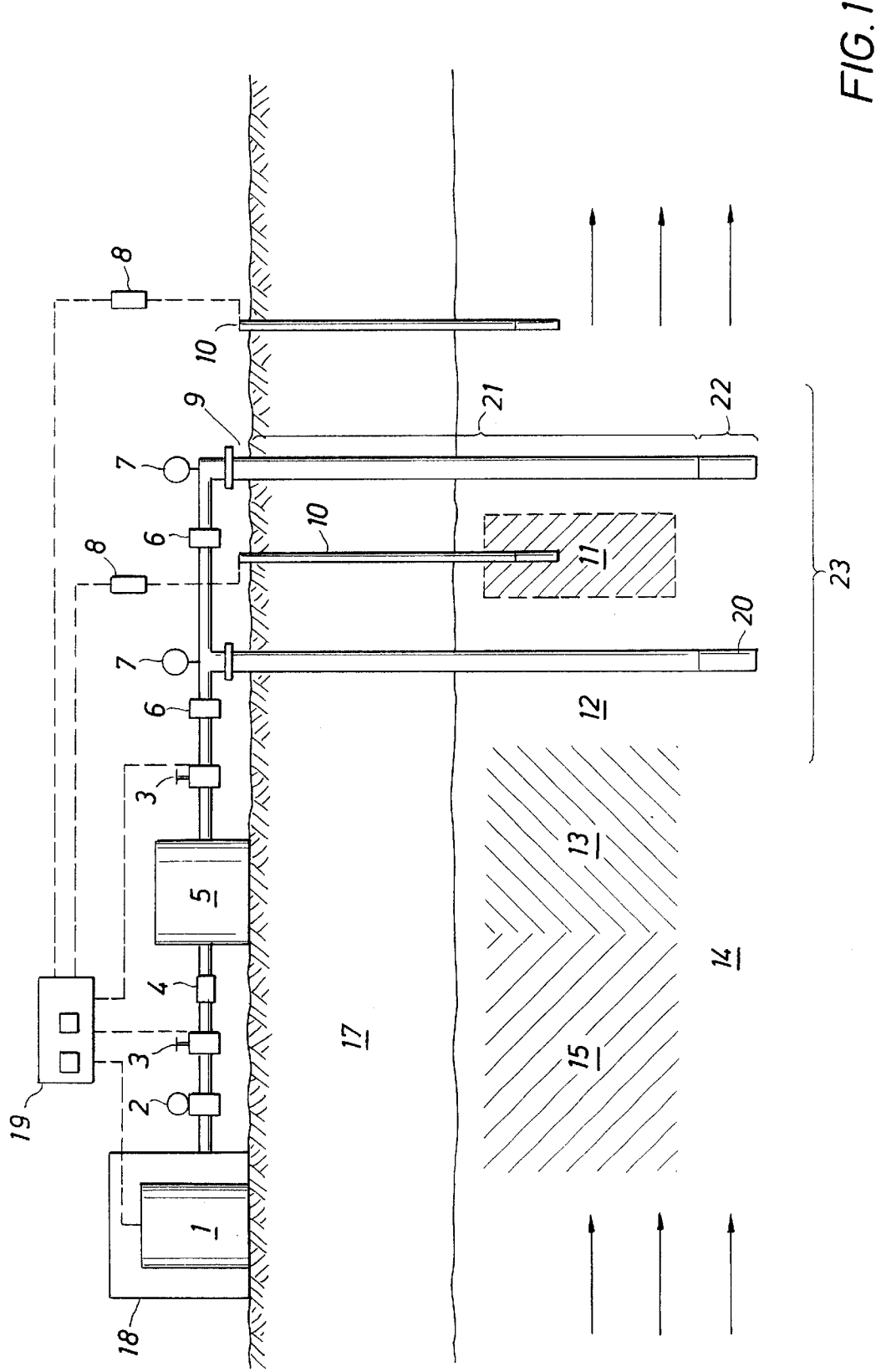
FIG. 1 is a cross-sectional view of an embodiment of this invention.
Figure 2:
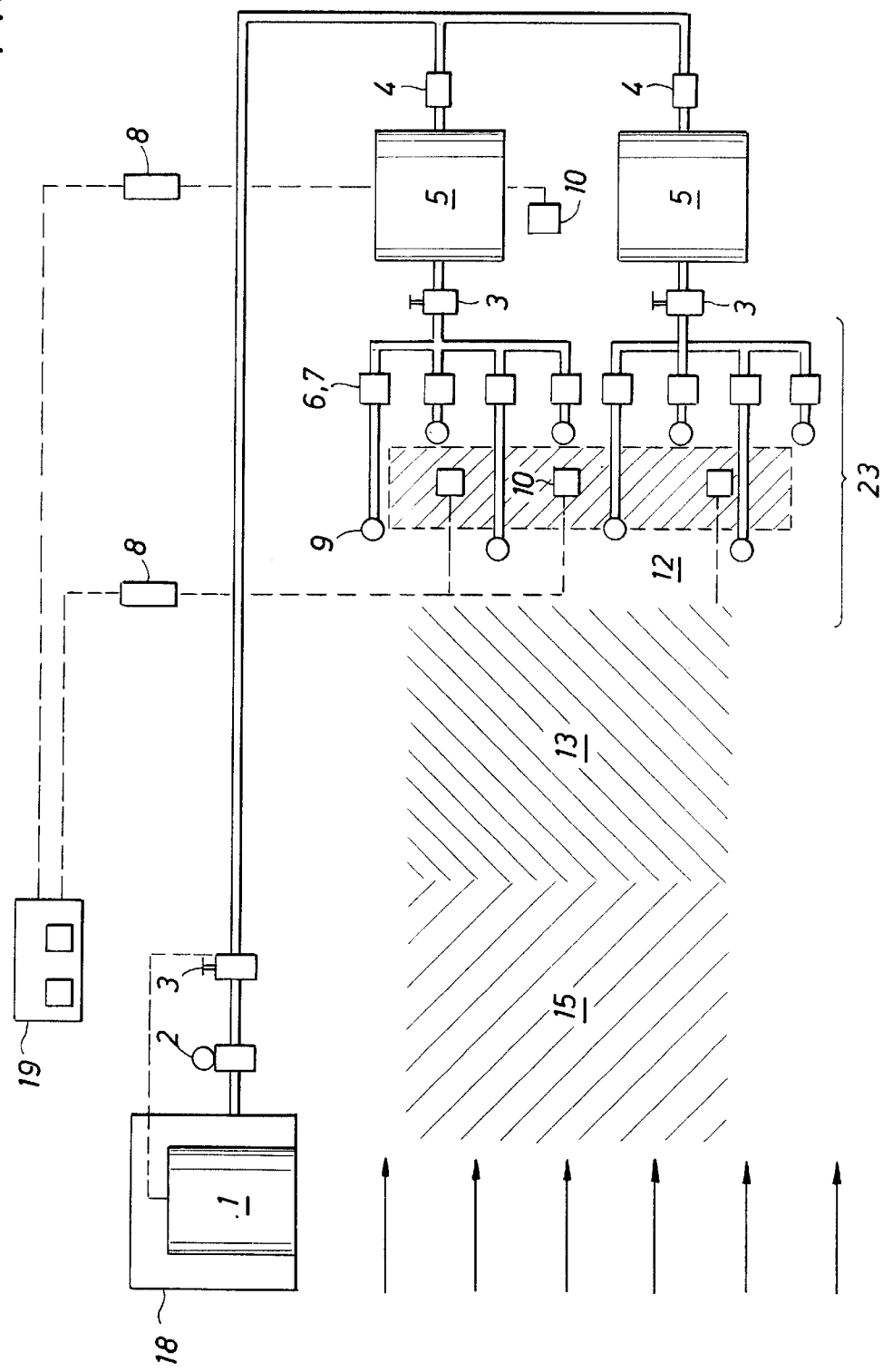
FIG. 2 is a plan view drawing of an embodiment of this invention.

Applicants have discovered by surprise that the remediation can be achieved with great success by using a network of oxygen delivery wells operated intermittently so as to maximize aerobic biodegradation without causing significant losses from other non-degrading mechanisms (e.g. volatilization, dispersion, etc.) Referring to FIGS. 1 and 2, the invention comprises one or more sources of oxygen-containing gas 1 connected to one or more subsurface gas injection points 20 via injectors 9. Oxygen-containing gas delivery is used to create one or more well-oxygenated zones 12 in the aquifer 14 conducive to aerobic biodegradation. Within these aerobic zones, a bacterial culture 11 capable of degrading the oxygenate chemical contaminant(s), specifically alkyl ethers/alcohols, more specifically MTBA and/or TBA is delivered. Contaminated groundwater 13, specifically contaminated with alkyl ethers (such as MTBE) and/or TBA flows from contaminated aquifer soils 15 to the treatment zones 23. As contaminated groundwater passes through this treatment zone, it is purified by biodegradation, and the toxic alkyl ethers/alcohols such as MTBE and TBA are converted to non-toxic substances such as carbon dioxide and water.

Also referring to FIGS. 1 and 2, the oxygen-containing gas sources 1 may be housed in enclosures 18. The oxygen-containing gas sources 1 may be comprised of air compressors, blowers, or combinations thereof with pressurized gas storage tanks. The oxygen gas sources 1 may also be comprised of commercially-available oxygen gas generators.

The oxygen-containing gas delivery systems must be designed so as to maintain relatively uniform aerobic conditions in the treatment zones 23, without causing significant contaminant loss through non-biodegradation loss mechanisms, such as volatilization and dispersion. The loss of contaminant(s) from volatilization (such as migration to the unsaturated zone) is typically less than 50%, preferably less than 20%, more preferably less than 10%, and still more preferably less than 7% by weight.

One non-limiting way for achieving this involves the intermittent pulsed injection of an oxygen-containing gas, such as air or pure oxygen. Thus, pulses of oxygen-containing gas are delivered through the injectors 9. When operated in this fashion, a portion of the oxygen-containing gas becomes trapped in the aquifer pore spaces and oxygen continuously dissolves into groundwater during the time period between injection pulses. Thus, oxygen is continuously delivered between pulses. In addition, pulsed gas delivery is critical as continuous delivery can cause reductions in water permeability to the extent that contaminants flow around, rather than through, the treatment zone. FIG. 1 depicts one embodiment of an apparatus for delivering oxygen-containing gas in an optimized intermittent mode. First, the desired injection pressure of the oxygen-containing gas is controlled with gas pressure regulators 2. The injection pressure must be greater than the hydrostatic head of water in the injectors 9; which is roughly 0.5 psig per foot of depth between the water table elevation and the top of the perforations in the oxygen delivery well. To eliminate the poor gas distribution problems that plague manifolded gas delivery wells, it is important that the delivery pressure be at least 5, and preferably at least 10 psig greater than the hydrostatic head of water. Illustrative examples of delivery pressures are in the 20–40 psig range. One or more gas storage tanks 5, are used to store the oxygen-containing gas between injection cycles. The gas storage tanks 5 are sized to contain the desired gas injection volume at the desired gas injection pressure. The gas storage tanks allow the short and rapid pulsed delivery of gas not achievable by wells directly connected to blowers, compressors, or other oxygen-generating equipment. Solenoid valves 3 and back-flow check valves 4 control the flow of gas from the oxygen-containing gas source 1 and to the injectors 9.

System monitoring and control is integral to optimal operation of this invention. System monitoring is typically comprised of a collection of pressure gauges 7 and gas flow meters 6 that are used to ensure gas delivery to each injector is occurring. At a minimum, pressure gauges are needed for each gas storage tank. In addition, groundwater monitoring points 10 and dissolved oxygen sensors 8 are used to monitor dissolved oxygen concentrations in the target treatment zone. Based on this data, the frequency and volume of oxygen-containing gas injections is adjusted through use of the controller 19. This controller may be a simple system of manual valves, but more often will involve electronic timers, and may even involve more complicated automatic control systems integrated with in situ oxygen sensors.

Gas injectors 9 are typically, but not limited to, constructed from a combination of perforated 22 and non-perforated conduit 21. The non-perforated conduit 21 must extend to below the target treatment zone 23, and must be installed so as to prevent the short-circuiting of oxygen-containing gas to the vadose zone 17. The perforated section 22 of the injector 9 must be placed below the target treatment zone, but may be aligned either vertically or horizontally. If aligned vertically as shown in FIG. 1, the perforated section is usually not much longer than a few feet.

As one aspect of the present invention, the dissolved oxygen concentration (DOC) in the aquifer treated (treatment zone) is increased to greater than 2 mg/L in the aquifer (groundwater) treated zone, preferably greater than 4 mg/L and more preferably more than 8 mg/l, and still more preferably greater than 18 mg/L within less than 40 Days, preferably within less than 30 days, more preferably within less than 20 days, still more preferably within less than 14 days of gas injection. Dissolved oxygen concentrations up to about 8 g/L can be achieved through air or oxygen gas delivery; igher dissolved oxygen concentrations require pulsed xygen gas delivery.

The pressure of the oxygen-containing torage tanks is at least 5, preferably 10, more preferably more than 20 psig, and still more preferably more than 30 psig above the hydrostatic pressure at the injection point. As a non-limiting illustrative example, the hydrostatic pressure at the injection point is calculated to be about 0.5 psig per ft. of depth below the water table. At a typical treatment zone, the injection points are at the depth of about 5–20 ft, preferably about 5–10 ft, below the water table. The hydrostatic pressure at the injection points is 2.5–10 psig. The injection (storage tank) pressure could then be at least 7.5–15 psig, and preferably greater than 22.5–30 psig. The injection pressure can be 6–60 psig.

To ensure adequate oxygen delivery, the space between the oxygen-containing gas injection points is typically less than 20 ft, and preferably less than 10 ft, and more preferably less than 7 ft, and still more preferably less than 6 ft. As a non-limiting example, the spacing between adjacent injection points can be about 3–5 ft apart, particularly in a shallow (<30 ft depth), relatively homogenous aquifer.

As one aspect of the present process, the minimum average volume (Vmin—given in cubic feet of gas measured at ambient temperature and ambient pressure) of total oxygen injected each time at each injecting point can be calculated by the following formula:

$$V_{min} = 0.1 \times A \times B \times P \div N$$

Wherein, A=treated area (square ft)
B=treatment thickness (ft)
P=porosity
N=number of injection points The volume of oxygen injected is about 1–100, preferably 1.25–20, and more preferably 1.25 to 3 times of "Vmin". "P" is the porosity and is typically a value between about 0.25 to about 0.45 and the standard values of P vary with the aquifer material, which can be looked up in reference books generally known to one skilled in the art.

It is understood that when the oxygen-containing gas is not a relatively pure oxygen, such as air, the volume of gas injected shall be adjusted according to the oxygen content of the oxygen-containing gas.

As an illustrative non-limiting example, a 100 square ft by 12 ft treatment zone with 30 oxygen injection point will require at least about 4, preferably 5–8, more preferably 5–7 cubic feet(based on measurement at ambient pressure and temperature) of oxygen per injection point.

The frequency for oxygen-containing gas injection will be variable and adjusted on a site specific basis. Typically it is from about once a week to about 10 times per day, specifically from about once a day to about 8 times a day, more specifically from about 2 times day to about 4 times a day. The duration of each injection of oxygen-containing gas at each injection points lasts from about 0.05 to about 4 minutes, preferably from about 0.1 to about 3 minutes, still more preferably from about 0.3 to about 2.0 minutes. As an illustrative non-limiting example, oxygen-containing gas is injected at each injection site at about 1 to about 20, specifically from about 2 to about 10, more specifically from about 3 to about 8 cubic feet per minute (based on the volume at ambient pressure) for from about 0.1 to about 3 minutes. As a specific illustrative example, the oxygen-containing gas is injected at the injection point (well) at about 4 cubic feet per minute i.e. 260 cubic feet per hour) for 0.5 to 1 minute for each injection.

As an embodiment of the present invention, to maximize aerobic degradation and not cause significant loss of contaminant(s) by evaporation and dispersion, the injection frequency and volume at each injection point have the relationship according to the following equation:

$$e^{[(-V \times F \times N \times H)/(W \times B \times Q)]} > 0.5$$

Wherein:

e=natural exponential
V=volume of gas injected at each injection point (ft3)
F=frequency of injections (number of injections per day)
N=number of gas injection points
W=width of treatment zone perpendicular to groundwater flow path (ft)
B=vertical thickness of treatment zone (ft)
Q=specific discharge of groundwater to treatment zone (ft/day)
H=Henry's Constant for contaminant of interest ((mg/L-water)/(mg/L-air))

Where conditions satisfy the equation above, less than 50% of the contaminant is volatilized and/or dispersed by the gas delivery process. Preferably, $e^{[(-V \times F \times N \times B)/(W \times B \times Q)]}$ is greater than 0.80, more preferably greater than 0.90, and still more preferably greater than 0.93.

As an illustrative example, the design and operating conditions in a test plot are as follows:

V=2.5 ft3/well
F=4 injections per day
N=21 wells
W=20 ft
B=10 ft
Q=0.3 ft/day)
H=0.02 (mg/L-water)/(mg/L-air)

Under these conditions:

$$e^{[-V \times F \times N \times H)/(W \times B \times Q)]} = 0.93$$

Under the above conditions, the test plot can achieve adequate oxygenation for biodegradation while maintaining only less than 10% loss (or even less than 7% loss) of contaminants by evaporation and/or volatilization.

The concentration of the culture delivered and contained in the treated zone will depend on the strength and activity of the culture.

Where MTBE remediation using the mixed bacterial culture disclosed in U.S. Pat. No. 5,750,364, ATCC Number 202057, is conducted, the concentration of the bacterial culture used is typically more than 100 mg, more preferably greater than 200 mg, more preferably greater than 250 mg, dry wt of cells/kg of soil. The culture is capable of degrading MTBE and TBA to carbon dioxide and oxygen.

The concentration of the culture contained in the injection slurry is generally within the range 100–10,000 mg/L, preferably about 200–5000 mg/L, and still more preferably about 500–4000 mg/L.

The apparatus for delivering bacterial slurry can be, but not limited to, injection wells, infiltration galleries e.g. via trenches or drains, direct injection under pressure through open-ended pipes. As a specific embodiment of the present invention, nutrients are also injected to the treatment site to enhance biodegradation. The apparatus is designed to deliver bacterial slurry effectively to distribute well through the treated zone in a fast enough fashion to prevent settling of the culture in the delivery system to prevent plugging of the apparatus, preferably sufficiently fast with sufficient pressure to reach the treatment area far enough from the injection site, more preferably with sufficient pressure and/or speed to alter/fracture/crush the soil structure to create channels for the bacterial to reach out farther in the treatment zone. As a non-limiting examples, where injection concentrations are more than 1000 mg dry wt of cells per liter of solution, an open-ended pipe under pressure of at least 10 psig, more preferably at least 40 psig, still more preferably more than 75 psig greater than the hydrostatic head pressure is used. For injection concentration of less than 1000 mg dry wt of cells per liter of solution, injection wells, infiltration galleries may suffice; if so, it is set-up typically in a net-work or galleries of delivery conduits. Injection of nutrients and/or bacteria can be made through the oxygen-containing gas injection wells, monitoring wells, or separate wells designed for bacterial slurry injections only.

Groundwater monitoring points 10 are also constructed from perforated and non-perforated conduit. In this case, it is important that the perforated conduit section be limited to the depth interval of interest for monitoring. Dissolved oxygen sensors 8 may be placed in situ, in the groundwater monitoring points, or above-ground. If above-ground, they will be coupled with a groundwater pumping system for bringing small quantities of groundwater above-ground from the groundwater monitoring wells 10. Groundwater monitoring points placed down-gradient of the target treatment zone will also be used to monitor the disappearance of the alkyl ethers and TBA.

Delivery of the bacterial culture 11 to the treatment zone may be achieved through: a) use of injection wells, b) infiltration via trenches or drains, c) direct injection under pressure through open-ended pipes. It is critical that sufficient culture be delivered initially as it is not typically expected that the degrading activity in the treatment zone will increase with time.

As one embodiment of the present process for remediating MTBE and/or TBA in the aquifer (groundwater, saturated zone, water-bearing zone, sub-soil), a mixed bacterial culture or pure bacterial culture described in U.S. Pat. No. 5,750,364 and U.S. Pat. No. 5,811,010, assigned to Shell Oil Company, as well as all subsequent continuation(-in-part) applications of Ser. No. 465,996 filed Jun. 6, 1996, is used; the descriptions of these patents/applications are herein incorporated by reference.

The invention can be further demonstrated by the following non-limiting illustrative embodiments.

ILLUSTRATIVE EMBODIMENTS

The following illustrative embodiments describe one application of this invention.

I. Bioremediation of MTBE

Figure 3:
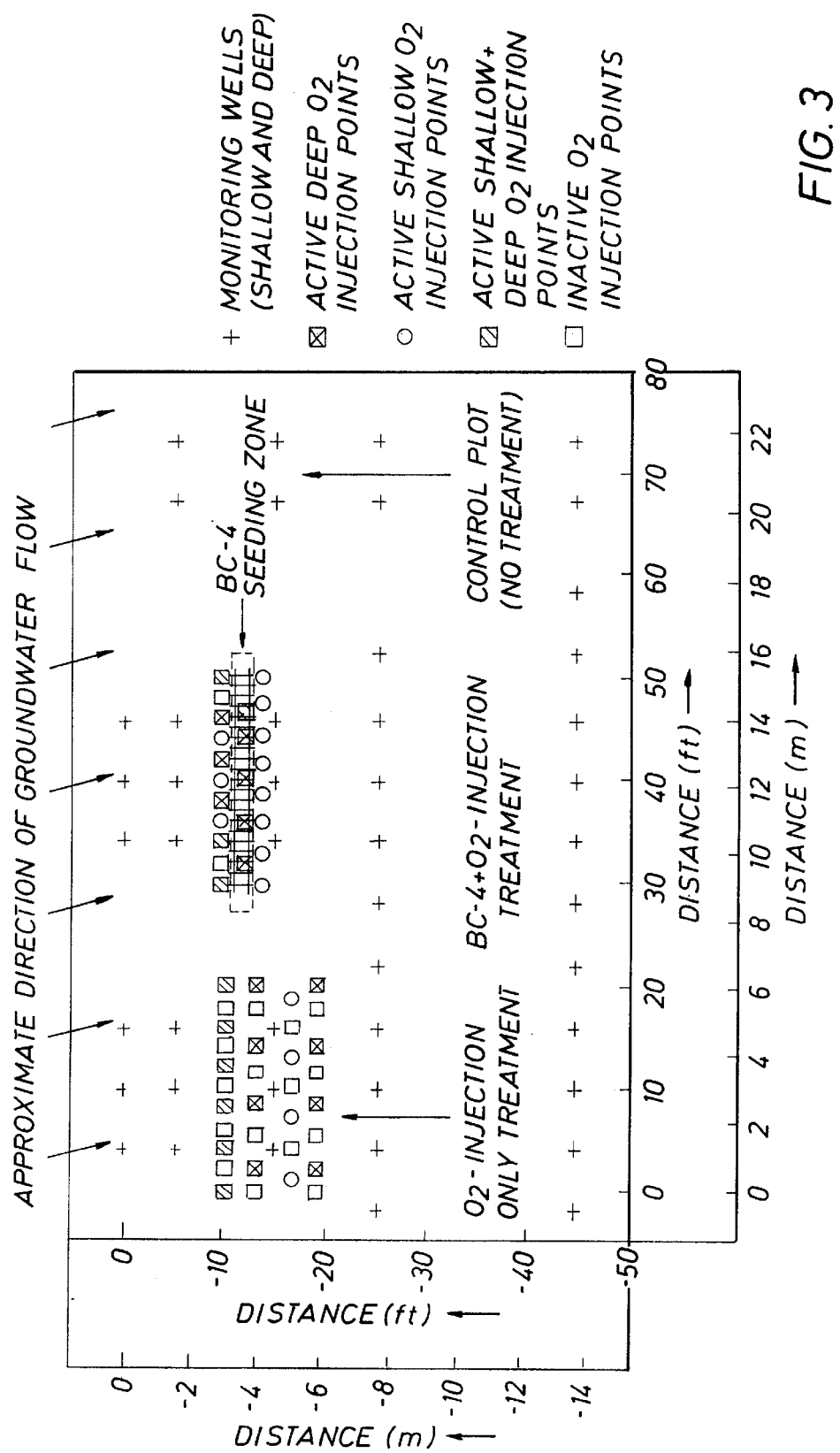
FIG. 3 shows a general lay-out of the remediation scheme/plot of one illustrative embodiment of the present invention.
Figure 4A:
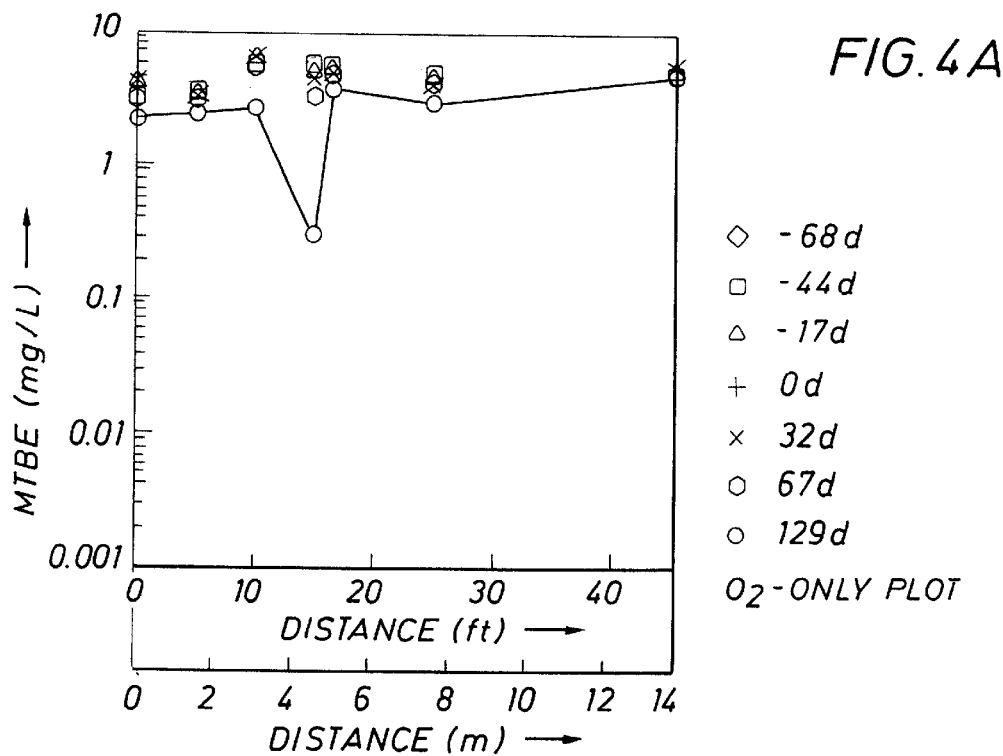
FIG. 4 illustrates the reduction of MTBE concentration in shallow monitoring points using the process of the present invention.
Figure 4B:
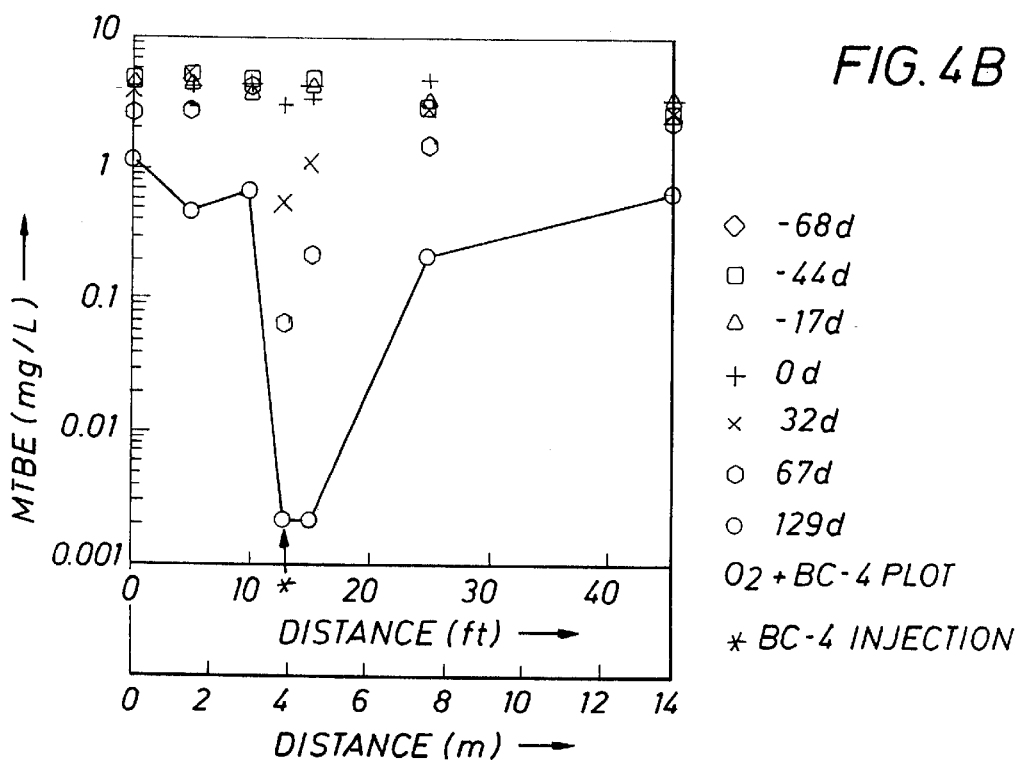
Figure 4C:
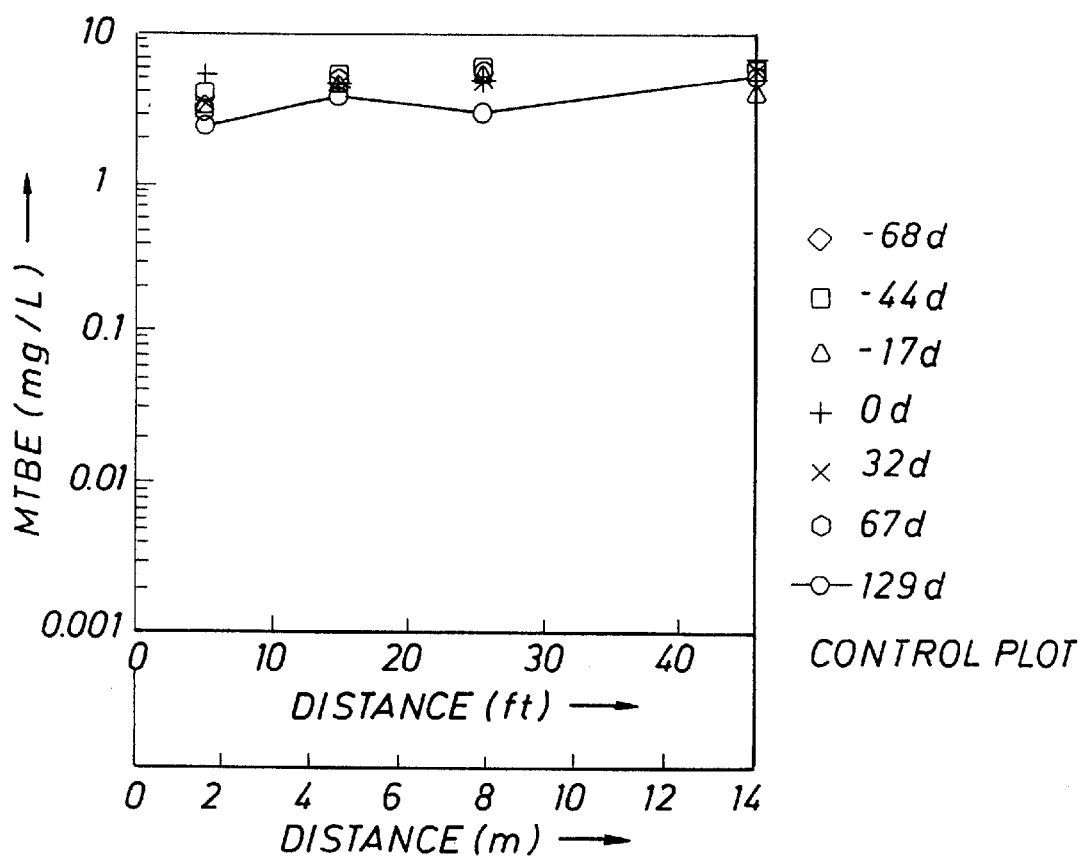
Figure 5A:
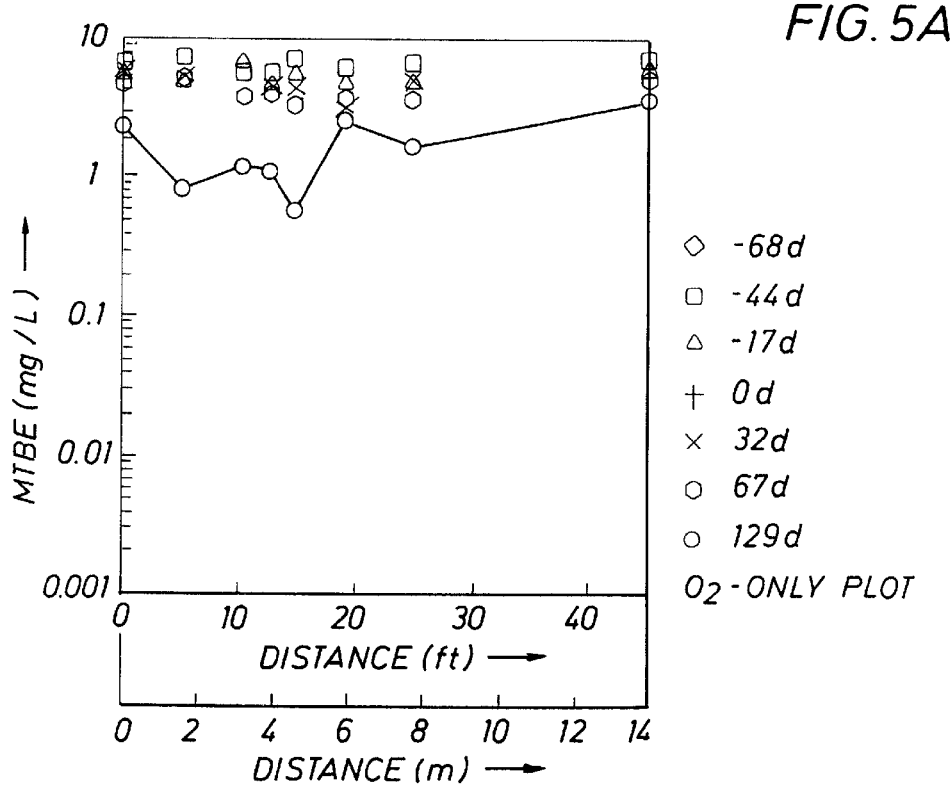
FIG. 5 illustrates the reduction of MTBE concentration in deep monitoring points using the process of the present invention.
Figure 5B:
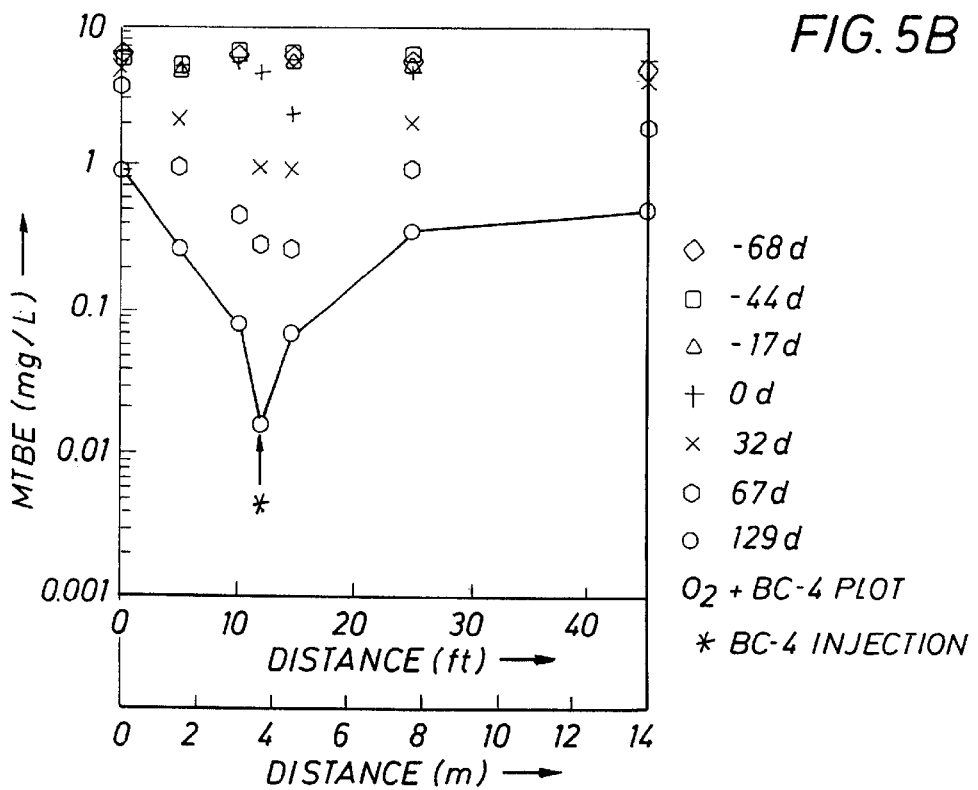
Figure 5C:
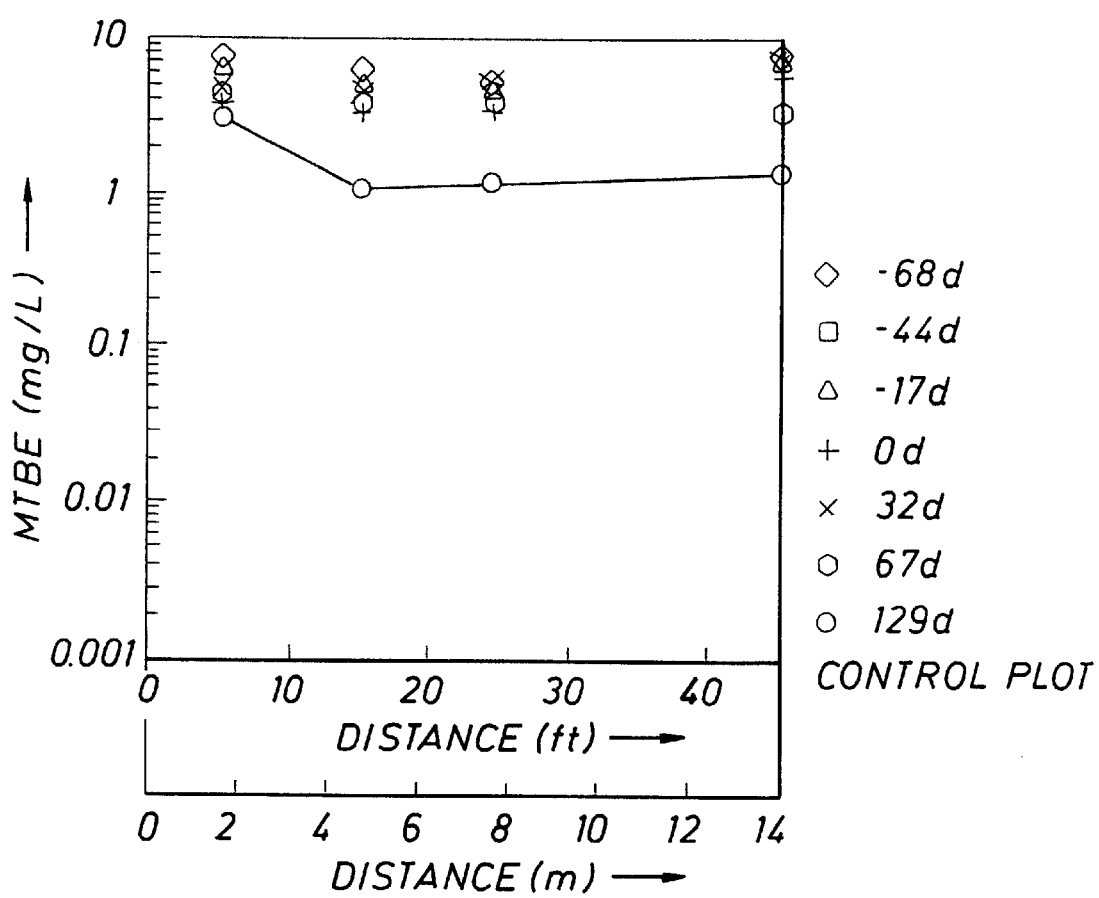

This invention was tested at the pilot-scale at the U.S. Navy CBC Base in Port Hueneme, Calif. The general lay-out of the demonstration plot is shown in FIG. 3. Three test cells were constructed to evaluate the performance of this invention relative to two controls. The center plot contains the illustrative embodiment of this invention. The plots on either side contain: a) a control plot (only monitoring), and b) a plot into which only oxygen gas is injected.

At this site the target treatment zone is roughly 5-ft long×20-ft wide×12-ft deep. 1400 gallons of mixed culture BC-4 containing roughly 2000 mg-TSS/L (total suspended solids per liter) were injected into this zone through the open end of rigid pipe. The pipe was driven down to the bottom of the target treatment zone and then slowly raised as the mixed culture was injected under pressure. Injections were made every 1-ft along the length of the treatment zone and approximately 5 gallons of mixed culture were injected for every 1-ft rise of the injection pipe.

The oxygen delivery system consisted of roughly 40 oxygen injectors distributed as shown in FIG. 3. Each was constructed from non-perforated ¾-inch diameter PVC pipe to which was attached either a 2-ft or 1-ft perforated section at the end. The injectors were installed using commercially-available direct-push well installation methods. Perforated sections were either placed from 17–19 ft below ground surface (hereinafter referred to as "deep oxygen delivery wells")., or from 14–15 ft below ground surface (hereinafter referred to as "shallow oxygen delivery wells"). Groundwater monitoring wells were constructed and installed in the same fashion, except they had 5-ft perforated sections placed at either 15–20 ft below ground surface (hereinafter referred to as "deep wells"). or 10–15 ft below ground surface (hereinafter referred to as "shallow wells").

The oxygen gas source was a commercially-available oxygen gas generator capable of generating up to 80 SCFM (standard cubic feet per minute). It was connected via a sequence of timers, pressure regulators, and solenoid-valves to eight gas storage vessels. Each storage vessel had an internal volume of roughly 2.5 cubic feet; when pressurized to 30 psig, each contained approximately 8 cubic feet of pure oxygen gas (based on volume at ambient pressure and ambient temperature) Each storage vessel was connected via electronic solenoid valves to three to five oxygen delivery wells. Timers were set so that oxygen gas could be delivered anywhere from one to eight times per day. Each oxygen gas storage tank was connected to 2 to 4 wells, and typically fully discharged in about 0.5 to about 1 minute.

FIGS. 4a, 4b, 4c and 5a, 5b, 5c display MTBE concentrations vs. distance from the top of each treatment plot for various times prior to, and after BC-4 injection. For reference, the times shown are measured relative to the date of BC-4 seeding; thus, t=−44 d corresponds to the start of the $O_2$ delivery system and t=0 corresponds to BC-4 seeding. Each figure depicts a transect along the direction of groundwater flow for one of the study plots (i.e., $O_2$ injection-only, BC-4+$O_2$ injection, and the control plot). For each distance along a given transect, the geometric mean of the measured concentrations is displayed in FIGS. 4 and 5.

For all the plots and all distances along the transects, MTBE concentrations are relatively stable for all times prior to the BC-4 seeding (t=0 in FIGS. 4 and 5). The dissolved oxygen concentrations in the treatment zone reached over 20 mg/L (or 25 mg/L) after about 14 days of oxygen injections.

Following BC-4 seeding and continued operation of the $O_2$ injection system for the next 67 days, decreases in MTBE concentrations are observed in the BC-4+$O_2$ injection plot. Immediately down-gradient of the BC-4 seeded zone MTBE concentrations decrease >90%, and other less dramatic declines in MTBE were observed up-gradient of the seeded region. In comparison, no significant changes are observed in MTBE concentrations in the $O_2$ injection-only or control plots.

In summary, the time series data clearly show the present invention, effectively provides a biobarrier to MTBE migration, and effectively reduces the MTBE contamination in the aquifer(s).

II. Oxyqen Delivery

A test plot was operated for at least 44 days with only oxygen gas delivery (no inoculation of bacterial culture) under the following conditions:

V=2.5 ft3/well
F=4 injections per day
N=21 wells
W=20 ft
B=10 ft
Q=0.3 ft/d(day?)
H=0.02 (mg/L-water)/(mg/L-air)

Under these conditions:

$$e^{[(-V \times F \times N \times H)/(W \times B \times Q)]} = 0.93$$

Figure 6:
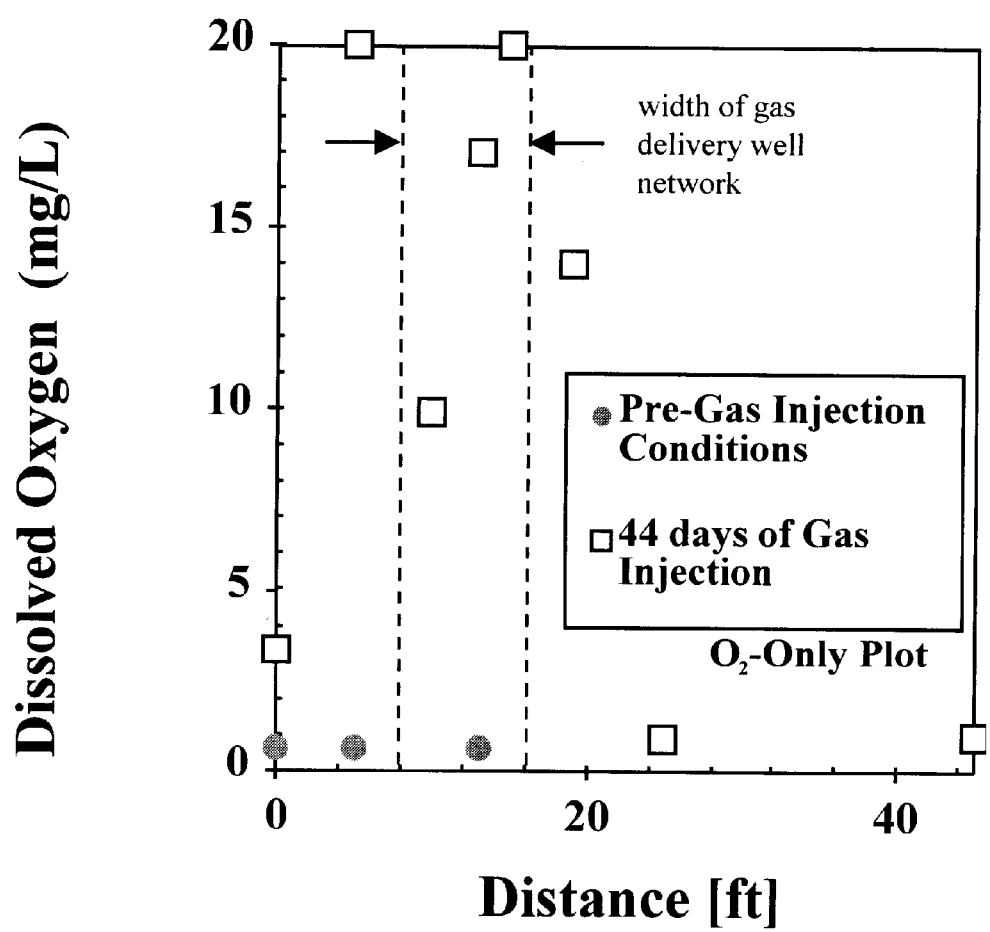
FIG. 6 illustrates the increases in dissolved oxygen throughout the treatment zone.
Figure 7:
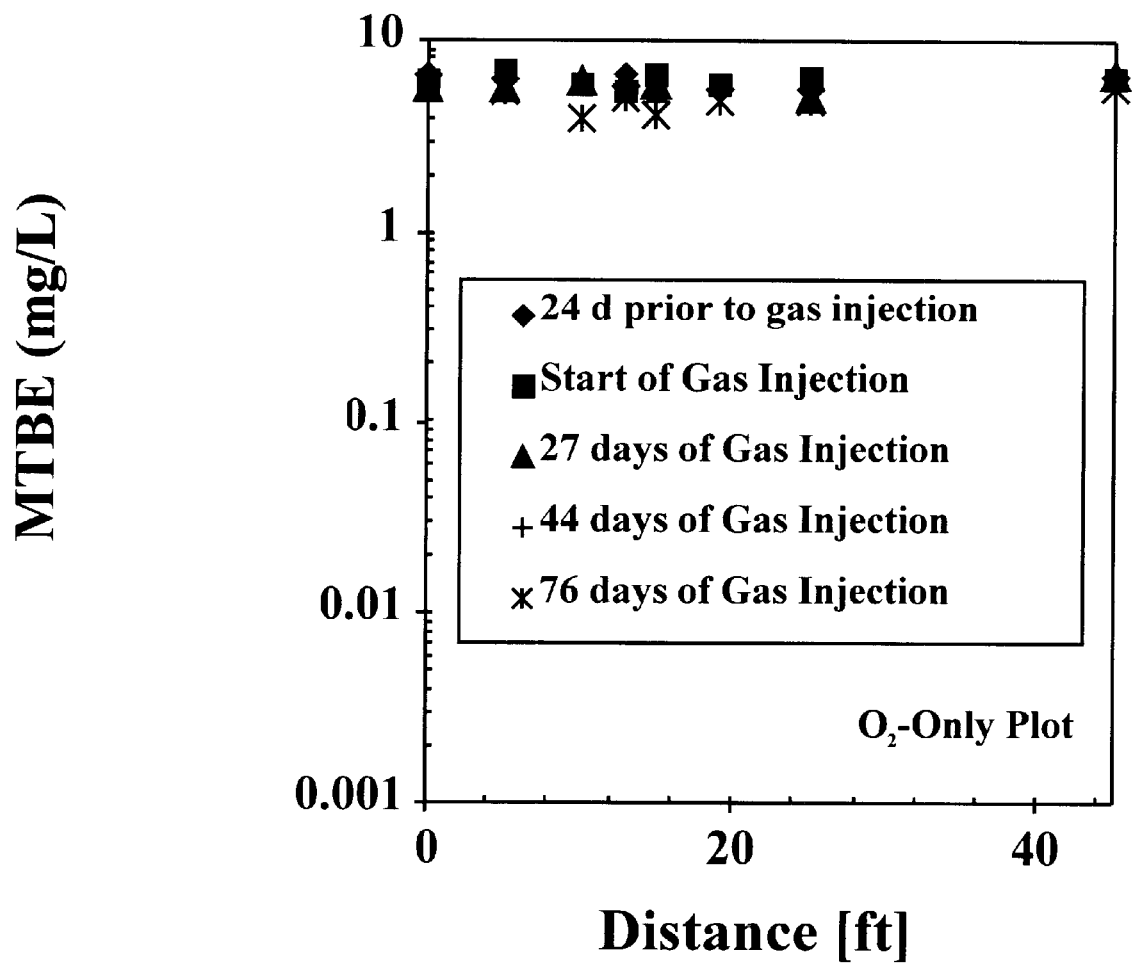
FIG. 7 illustrates the effect of oxygen-containing gas injections on MTBE concentrations without the inoculation of MTBE degradable culture.

Results from the treatment plot is shown in FIGS. 6 and 7. FIG. 6 shows the increases in dissolved oxygen throughout the treatment zone in this 44 day period; increases in excess of 10 mg/L were achieved throughout much of the target zone. FIG. 7 shows the effect on MTBE concentrations for 76 days of gas injection. As can be seen, MTBE concentrations remain essentially unchanged, thereby providing evidence that volatilization could not be significant under these design and operating conditions.

What is claimed is:

1. A method for in situ remediation of an aquifer having a treatment zone through which passes water contaminated with at least one chemical contaminant which method comprises:
   a) delivering to the treatment zone a microbial culture capable of degrading at least one chemical contaminant present in said aquifer; and
   b) injecting, by at least two conduits, an oxygen-containing gas at a pressure of at least 5 psig above the hydrostatic pressure at injection points with injection frequency and volume at each injection point having the relationship according to the following equation:

$$e^{[(-V \times F \times N \times H)/(W \times B \times Q)]} > 0.50$$

Wherein:
   e=natural exponential
   V=volume of gas injected at each injection point (ft3)
   F=frequency of injections (number of injections per day)
   N=number of gas injection points
   W=width of the treatment zone perpendicular to groundwater flow path (ft)
   B=vertical thickness of treatment zone (ft)
   Q=specific discharge of groundwater to the treatment zone (ft/day)
   H=Henry's Constant for contaminant of interest ((mg/L-water)/(mg/L-air)).

2. The method of claim 1, wherein, wherein $e^{[(-V \times F \times N \times H)/(W \times B \times Q)]}$ is greater than 0.80.

3. The method according to claim 1, wherein said contaminant is an oxygenate chemical; wherein $e^{[(-V \times F \times N \times H)/(W \times B \times Q)]}$ is greater than 0.90 and the contaminant loss from volatilization is less than 10% by weight.

4. The method according to claim 1, wherein the contaminant is selected from the group consisting of (a) methyl-t-butyl ether (MTBE), (b) t-butyl alcohol (TBA), and (c) a mixture thereof; wherein at least a portion of the contaminant is degraded to carbon dioxide by said microbial culture.

5. The method according to claim 1, wherein the dissolved oxygen concentration in the treatment zone is greater than 2 mg/L.

6. The method according to claim 1, wherein the dissolved oxygen concentration in the treatment zone is greater than 8 mg/L.

7. The method according to claim 1, wherein the dissolved oxygen concentration in the treatment zone is greater than 18 mg/L.

8. The method according to claim 1, wherein said bacterial culture is delivered to the treatment zone by a network of a plurality of delivery conduits at a pressure of at least 10 psig greater than the hydrostatic head pressure at point(s) of injection.

9. The method according to claim 1, the oxygen-containing gas is injected to the aquifer by at least two gas injectors having respective perforated sections located at at least two different depths within the aquifer.

10. The method according to claim 1, which method further comprises storing the oxygen-containing gas in at least one gas storage tank and subsequently delivering the oxygen-containing gas to at least one sub-surface injection point by intermittent pulsed injection; and maintaining relatively uniform aerobic conditions in the treatment zone by adjusting the volume per injection and the injection frequency, and by monitoring the oxygen flow from each gas storage tank to each sub-surface gas injection point using at least one pressure gauge and/or gas flow meter, monitoring dissolved oxygen concentration in the treatment zone using ground water monitoring points and dissolved oxygen sensors, and adjusting the frequency and volume of each injection of oxygen-containing gas using a controller associated with said monitoring equipment.

11. The method as claimed in claim 10, which method further comprises storing the oxygen-containing gas in at least two gas storage tanks, each storage tank being connected to at least one sub-surface injection point.

12. The method as claimed in claim 1, wherein said microbial culture and said oxygen-containing gas is delivered through the same conduit(s) to the treatment zone.

13. A method for in situ remediation of oxygenate chemical(s) in an aquifer having a treatment zone through which passes water contaminated with oxygenate chemicals, which method comprises:
   a) delivering to the treatment zone a microbial culture capable of degrading at least one oxygenate chemical contaminant; and
   b) injecting, by at least two conduits, an oxygen-containing gas at a pressure of at least 5 psig above the hydrostatic pressure at injection points with injection frequency and volume at each injection point having the relationship according to the following equation:

$$e^{[(-V \times F \times N \times H)/(W \times B \times Q)]} > 0.90$$

Wherein:
   e=natural exponential
   V=volume of gas injected at each injection point (ft3)
   F=frequency of injections (number of injections per day)
   N=number of gas injection points
   W=width of treatment zone perpendicular to groundwater flow path (ft)
   B=vertical thickness of treatment zone (ft)
   Q=specific discharge of groundwater to treatment zone (ft/day)
   H=Henry's Constant for contaminant of interest ((mg/L-water)/(mg/L-air))

Wherein the loss of contaminant from volatilization and/or dispersion is less than 10% by weight; wherein the oxygen-containing gas is injected to the aquifer by at least two gas injectors having respective perforated sections located at least two different depths within the aquifer; wherein the oxygen-containing gas is injected to the aquifer by a plurality of gas injectors spaced less than 10 ft apart; wherein each injection of oxygen-containing gas at each injection point lasts from about 0.05 to about 4 minutes.

* * * * *